(12) United States Patent
Border et al.

(10) Patent No.: US 7,852,454 B2
(45) Date of Patent: Dec. 14, 2010

(54) DUAL RANGE FOCUS ELEMENT

(75) Inventors: John N. Border, Walworth, NY (US);
Russell J. Palum, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 196 days.

(21) Appl. No.: 12/284,777

(22) Filed: Sep. 25, 2008

(65) Prior Publication Data

US 2010/0073623 A1    Mar. 25, 2010

(51) Int. Cl.
G02F 1/13 (2006.01)
G02B 3/06 (2006.01)

(52) U.S. Cl. ........................ 349/200; 359/742
(58) Field of Classification Search .................. None
See application file for complete search history.

(56) References Cited

U.S. PATENT DOCUMENTS

| | | | |
|---|---|---|---|
| 4,190,330 A | 2/1980 | Berreman | |
| 4,572,616 A | 2/1986 | Kowel et al. | |
| 5,877,809 A | 3/1999 | Omata et al. | |
| 6,441,855 B1 | 8/2002 | Omata et al. | |
| 6,795,157 B2* | 9/2004 | Okuwaki et al. | 349/200 |
| 6,857,741 B2 | 2/2005 | Blum et al. | |
| 6,885,819 B2 | 4/2005 | Shinohara | |
| 7,404,636 B2 | 7/2008 | Blum et al. | |
| 7,538,830 B2* | 5/2009 | Sasuga | 349/57 |
| 2003/0160886 A1 | 8/2003 | Misawa et al. | |
| 2008/0055536 A1* | 3/2008 | Shimozono et al. | 349/200 |

OTHER PUBLICATIONS

"Liquid Crystal Lens Review" by C. W. Fowler and E. S. Pateras, published in Opthalmic and Physiological Optics, 1990, vol. 10, pp. 186-194.

Thesis by Emil Halstaad, Uppsala University, Acta Universitatis Uppsaliesis, Comprehensive Summaries of Uppsala Dissertations from the Faculty of Science and Technology, 1048, 71pp, ISBN 91-554-6110-7), 2004.

* cited by examiner

*Primary Examiner*—Tina M Wong
(74) *Attorney, Agent, or Firm*—Peter P. Hernandez; Peyton C. Watkins

(57) ABSTRACT

An autofocus system is provided for image capture that includes a liquid crystal focus lens which includes a dual range liquid crystal lens with a thinner liquid crystal lens (385) and a thicker liquid crystal lens (365) separated by a single shared electrode (370). Wherein the thinner liquid crystal lens (385) has a smaller optical power and a faster response time and the thicker liquid crystal lens (365) has a larger optical power and a slower response time. The autofocus system has a focusing effect that is produced by the combined optical power of the thinner liquid crystal lens and the thicker liquid crystal lens. A method for focusing an image capture device and an image capture device are also described.

20 Claims, 9 Drawing Sheets

DUAL RANGE FOCUS ELEMENT

FIELD OF THE INVENTION

The invention pertains to the field of autofocus systems for digital cameras. More specifically the invention pertains to the field of liquid crystal focus elements for fast focusing of image capture devices that can be used for capturing still images or video images.

BACKGROUND OF THE INVENTION

Typical autofocus systems in a digital camera for capturing still images or video, uses a "through-the-lens" autofocus system that captures a series of 5-20 or more autofocus images taken with a moveable focus lens in different focusing positions. For an autofocus system that includes a liquid crystal focus lens with variable focal length (or variable optical power) for focusing, instead of moving the focus lens, the liquid crystal focus lens is adjusted electronically to provide 5-20 or more different focal lengths for the autofocus images. After capture, the 5-20 or more autofocus images are analyzed for contrast to determine the focus lens condition that delivers the image with the highest contrast which is deemed the best focus condition. In the analysis, focus values are generated for each autofocus image based on the level of contrast present. The focus lens is then returned to the focus condition that produced the autofocus image with the highest contrast, or an interpolated position between two or more of the autofocus images, before a final image is captured and stored. This method of autofocusing is known as the "hill climb method" because it generates a sequence of focus values that increase in level until they pass over a peak, i.e., a "hill".

"Through-the-lens" autofocus systems can be very accurate since they measure focus quality directly from autofocus images captured with the same high quality taking lens that is used to capture the final image. However "through the lens" autofocus systems can also be very slow due to the many movements of the focusing lens required and the many autofocus images that must be captured and analyzed. This slowness in time-to-focus contributes to the objectionable delay perceived by the user between the time when the capture button is pressed and the image is actually captured which is known as shutter lag. It is desired to reduce shutter lag.

To reduce the time-to-focus, autofocus images are typically sub-sampled wherein only a portion of the available pixels are captured in the autofocus images e.g. as in a region of interest in the image such as where a face has been detected, to reduce the number of pixels that have to be analyzed. Typically, autofocus images are comprised of all the different types of pixels present including red, green and blue such as are present on an image sensor that has a Bayer pattern of colored pixels. For the case of an image sensor that has some pixels that are more sensitive to light such as panchromatic pixels that absorb a wider portion of the visible spectrum, autofocus images can be comprised of just the more sensitive pixels to enable shorter exposures and faster capture of the autofocus images. In addition, the pixels that are used to capture the autofocus images may be binned to increase the effective size of the pixels to increase sensitivity and enable shorter exposure times. Finally, the focusing lens must move very rapidly fast between focus positions or focal lengths. For an autofocus system with a liquid crystal focus lens, the time to focus is substantially limited by the relatively slow response (response times of 0.2 to 2.0 sec for a 10 diopter change) of the liquid crystal focus lens as it changes focal lengths over the range of different focus positions evaluated during the autofocus process.

A flow diagram of a conventional "hill climbing" contrast autofocus process is shown in FIG. 1 for gathering the autofocus images. FIG. 2, is an illustration of the relationship between the focus evaluation values obtained from analyzing the autofocus images and the lens position. In FIG. 2, the abscissa indicates the focusing position of a moveable focus lens (which is related to the focal length or optical power of the lens assembly) along the optical axis of the lens or the focal length of a fixed liquid crystal focus lens, the ordinate indicates the focusing evaluation value relative to a particular focus position P.

In FIG. 1, the autofocus process is begun when the user presses the capture button although other methods can be employed to initiate the autofocus process such as detecting movement of the camera. In a "whole way" autofocus evaluation, the complete set of autofocus images are captured and stored before the autofocus images are evaluated or analyzed for contrast. Wherein the number of autofocus images captured is determined by the depth of field of the lens, so that a lens with a greater depth of field requires fewer autofocus images than a lens with a lesser depth of field.

FIG. 3A shows a typical PRIOR ART liquid crystal lens 300. The liquid crystal lens 300 is comprised of a single thick liquid crystal lens 330 of thickness d with electrodes 310 and 320 on either side. Wherein the electrodes are comprised of layers of transparent electrically conductive material that has been coated onto a transparent substrates. The electrodes and the associated transparent substrates can be planar as shown or curved to modify the optical power of the liquid crystal lens. By applying a voltage V1 across the electrodes, the optical power of the lens can be caused to change. The electrodes can also be modified to produce different electric fields that act on the liquid crystal material to change the optical power over the surface of the liquid crystal lens. Various methods of producing lenses with controllable optical power have been disclosed in the patent literature. An example of a liquid crystal lens with controllable optical power can be found in U.S. Pat. No. 4,190,330. In addition, since liquid crystal materials are polarization sensitive, the liquid crystal material 330 can be comprised of 2 layers of liquid crystal materials with orthogonal molecular orientations separated by a glass substrate, that are operated in unison as disclosed in U.S. Pat. No. 4,572,616 so that the liquid crystal lens acts on all the polarization states of the light passing through the lens. A discussion of the evolution of liquid crystal lenses can be found in an article by C. W. Fowler and E. S. Pateras, "Liquid Crystal Lens Review" published in Ophthalmic and Physiological Optics, 1990, Vol. 10, pages 186-194.

DETAILED DESCRIPTION OF THE INVENTION

Figure 1:
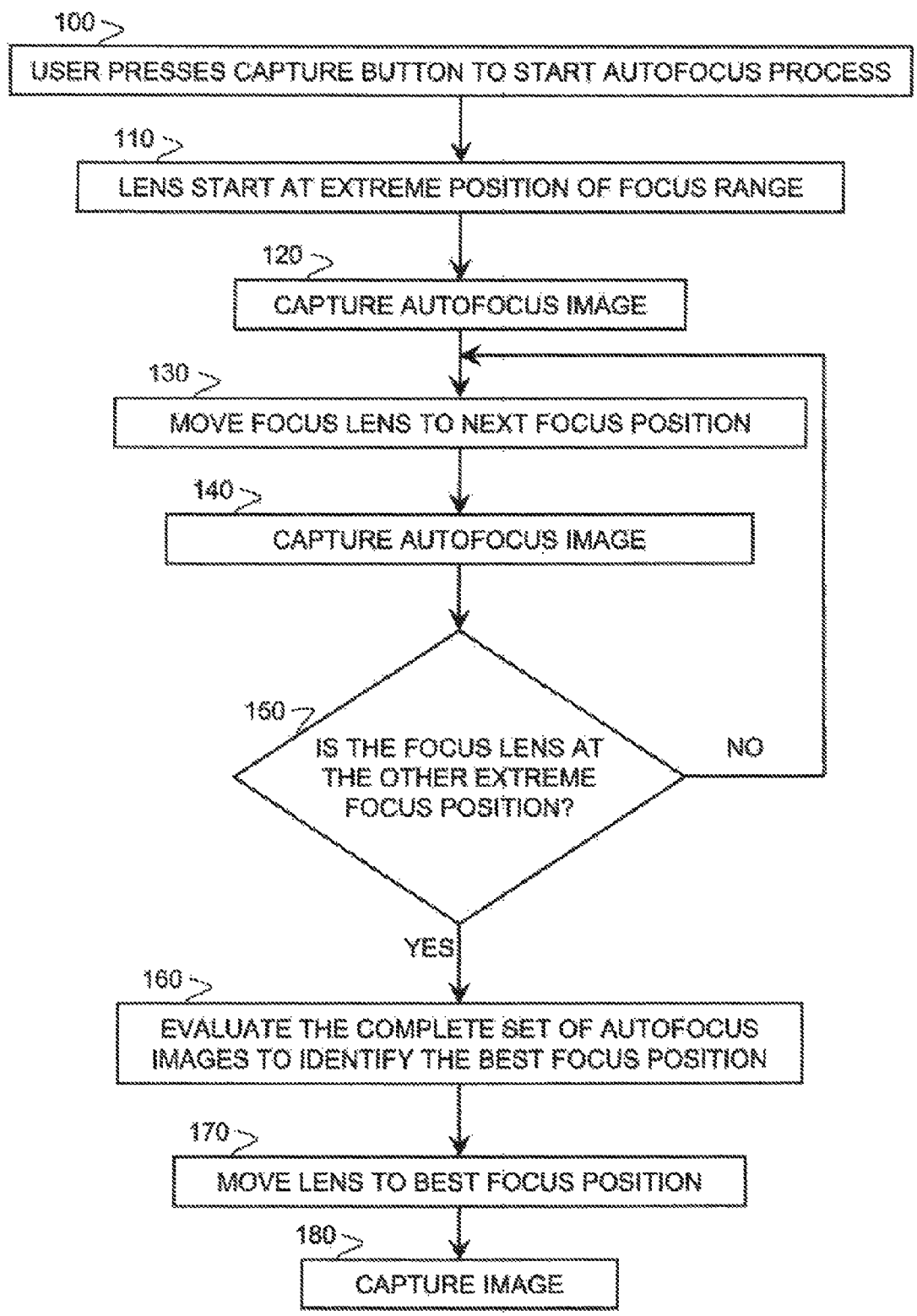
FIG. 1 is a flow chart of a PRIOR ART "hill climb" method of autofocus.
Figure 2:
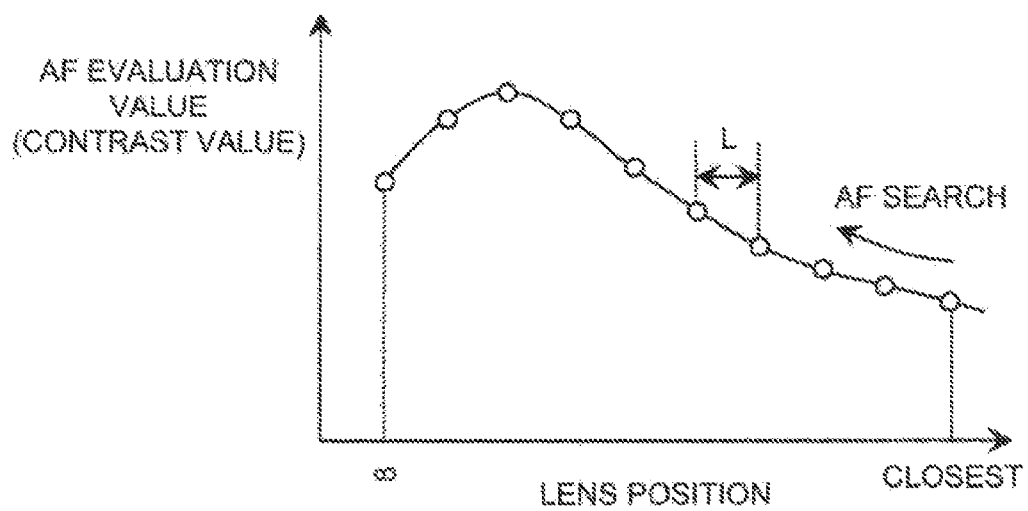
FIG. 2 is an illustration of a PRIOR ART focus evaluation value vs. focus lens position that is produced from a contrast evaluation of the autofocus images.

The invention has been described in detail with particular reference to certain preferred embodiments thereof, but it will be understood that variations and modifications can be effected within the spirit and scope of the invention.

It one embodiment of the present invention an autofocus system is provided for image capture that overcomes the above identified problems by providing a liquid crystal focus lens which is comprised of a dual range liquid crystal lens with a thinner liquid crystal lens and a thicker liquid crystal lens separated by a single shared electrode. Wherein the thinner liquid crystal lens has a smaller optical power and a faster response time and the thicker liquid crystal lens has a larger optical power and a slower response time. The autofocus system has a focusing effect that is produced by the combined optical power of the thinner liquid crystal lens and the thicker liquid crystal lens. However, when compared to a single liquid crystal lens with the combined thickness of the thinner liquid crystal lens and the thick liquid crystal lens, the response times of both the thin liquid crystal lens and the thick liquid crystal lens are faster than the single liquid crystal lens. It should be noted that for the purposes of the invention, the terms optical power and focal length can be used interchangeably as applied to a focus lens, as a change in optical power causes a change in focal length of the focus lens.

In a further embodiment of the invention, the dual range liquid crystal lens is used to perform an autofocus routine that is comprised of two complimentary sets of steps. Wherein the thinner liquid crystal lens is used to perform a set of small fast optical power steps over a small range of optical power where an autofocus image is captured at each step. The thicker liquid crystal lens is used to perform larger slower steps of optical power as needed that are combined optically with the smaller steps from the thinner liquid crystal lens. When the thinner liquid crystal lens reaches the last step of it's optical power range within a set, it is reset to the first step of it's optical power range and a new set of optical power steps are repeated in coordination with the slower and larger optical power steps of the thicker liquid crystal lens. Autofocus images are captured for each optical power step provided by the combined thin and thick liquid crystal lenses of the dual range liquid crystal focus lens. The autofocus images are evaluated for each set of optical power steps provided by the thin liquid crystal lens to see if a peak in focus value is present within the set of optical power steps. If a peak in focus value is present within a set of autofocus images produced with the optical power steps of the thinner liquid crystal lens, the autofocus routine is stopped and the settings of both the thin liquid crystal lens and the thick liquid crystal lens are returned to the settings that produced the peak focus value and a final image is captured and stored. If a peak in focus value is not detected, the optical power of the thicker liquid crystal lens is increased by one large step and the optical power steps of the thinner liquid crystal lens are repeated in an additional set. Optical power sets are repeated with autofocus images captured at each optical power step until a peak in focus value is detected during focus evaluation and a final image has been captured. Together, the combined optical power of the two liquid crystal lens of the dual range liquid crystal lens provides a large range of optical power for focusing over a large focus range from very near to infinity while also providing fast small steps of focal length for fast autofocus over a small range.

In still another embodiment of the invention, the starting optical power for the thicker liquid crystal lens is chosen as to correspond to the hyperfocal length of the lens assembly to provide the widest range of focus for the autofocus system within a single set of optical power steps and associated captured autofocus images in the optical power range of the thinner liquid crystal lens. In yet a further embodiment of the invention, the starting optical power of the thicker liquid crystal lens is chosen as the focus setting for the last image captured by the camera.

Figure 3A:
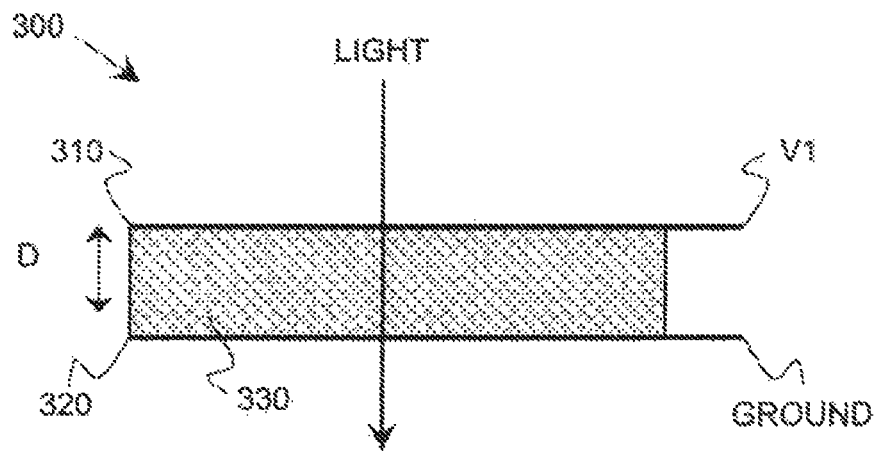
FIG. 3A is a schematic diagram of a PRIOR ART liquid crystal lens with a single thick liquid crystal lens.
Figure 3B:
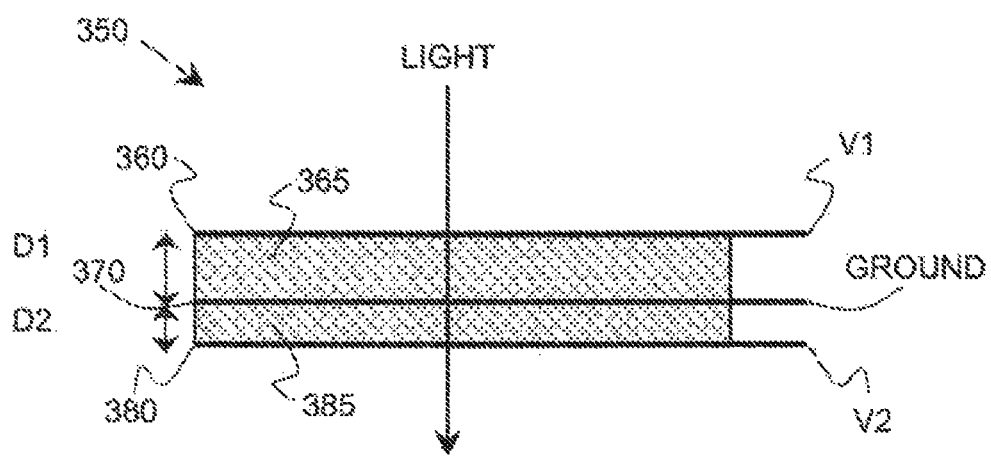
FIG. 3B is a schematic diagram of a dual range liquid crystal lens as described in the invention with 2 different independently controllable liquid crystal lenses where one liquid crystal lens is thinner than the other.

In FIG. 3B a schematic diagram of a dual range liquid crystal lens 350 is shown that includes 2 liquid crystal lenses 365 and 385 of thicknesses d1 and d2 respectively as comprised by the invention. Wherein d1 and d2 when combined, equal d so that both of the liquid crystal lenses of the invention are thinner than the single layer of the PRIOR ART. The 2 liquid crystal lenses of the dual range liquid crystal lens can be operated independently by applying voltages V1 and V2 to their respective electrodes 360 and 380. As further shown in FIG. 3B, the dual range liquid crystal lens 350 is constructed with the thinner 385 and thicker 365 liquid crystal lenses separated by a shared transparent electrode 370 which may be operated as a ground or some other shared voltage between the 2 liquid crystal lenses 365 and 385. By using a single shared electrode 370 on a single glass substrate between the 2 liquid crystal lenses, the dual range liquid crystal lens 350 can be made substantially thinner than if 2 separate liquid crystal lenses with 2 electrodes each were stacked on top of each other. In addition, since the electrodes in liquid crystal lenses are typically formed from materials such as indium tin oxide coated onto glass substrates, which absorbs some of the light as it passes through, reducing the number of electrode layers can increase the overall light transmission through the dual range liquid crystal lens 350. Although in FIG. 3B only two lenses have been shown 365 and 385, in other embodiments different number of lenses may be used.

As shown in FIG. 3B, the thicknesses of the 2 liquid crystal lenses 365 and 385 are substantially different from one another wherein the thickness ratio can vary from 60/40 to 95/5 as disclosed by the invention. Since the response time for a liquid crystal lens is proportional to the square of the thickness and the optical power is proportional to the thickness (for an excellent analysis of the performance of liquid crystal optics see a thesis by Emil Halstaad, Uppsala University, Acta Universitatis Uppsaliesis, Comprehensive Summaries of Uppsala Dissertations from the Faculty of Science and Technology, 1048, 71 pp, ISBN 91-554-6110-7) the effect of the different thicknesses of the 2 liquid crystal lenses is shown in Table 1. The response time of the dual range liquid crystal lens 350 is determined by the response time of each of the layers as operated individually while the optical power of the dual range liquid crystal lens 350 is determined by adding the optical power of each of the layers together. So that, compared to a single layer liquid crystal lens with relative layer thickness 1.00, a 70/30 thickness ratio lens which has the same total liquid crystal thickness (0.70+0.30=1.00), will have response times under ½ and $\frac{1}{10}^{th}$ for the 2 respective layers while having the same total optical power.

TABLE 1

Liquid Crystal Lens Performance as a Function of Thickness

| Relative thickness | Relative response time | Relative optical power |
|---|---|---|
| 1.00 | 1.000 | 1.00 |
| 0.95 | 0.903 | 0.95 |
| 0.90 | 0.810 | 0.90 |
| 0.70 | 0.490 | 0.70 |
| 0.60 | 0.360 | 0.60 |
| 0.40 | 0.160 | 0.40 |
| 0.30 | 0.090 | 0.30 |
| 0.10 | 0.010 | 0.10 |
| 0.05 | 0.003 | 0.05 |

Figure 4A:
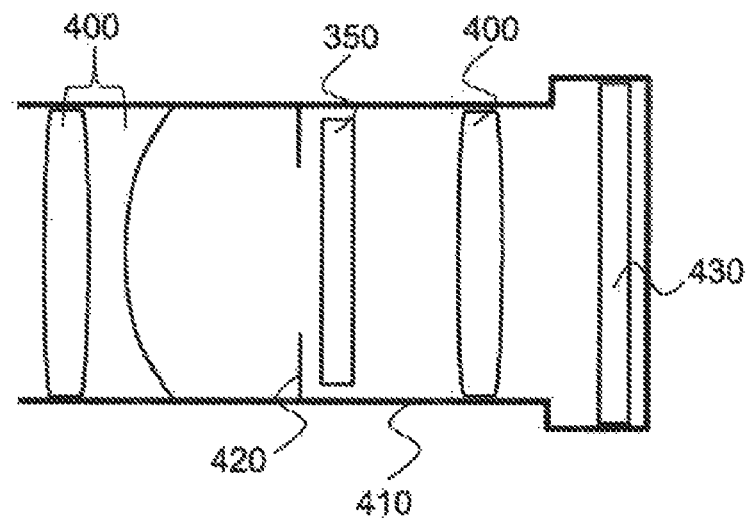
FIG. 4A is a schematic diagram of an image module in a lens barrel that includes the liquid crystal lens of the invention.
Figure 4B:
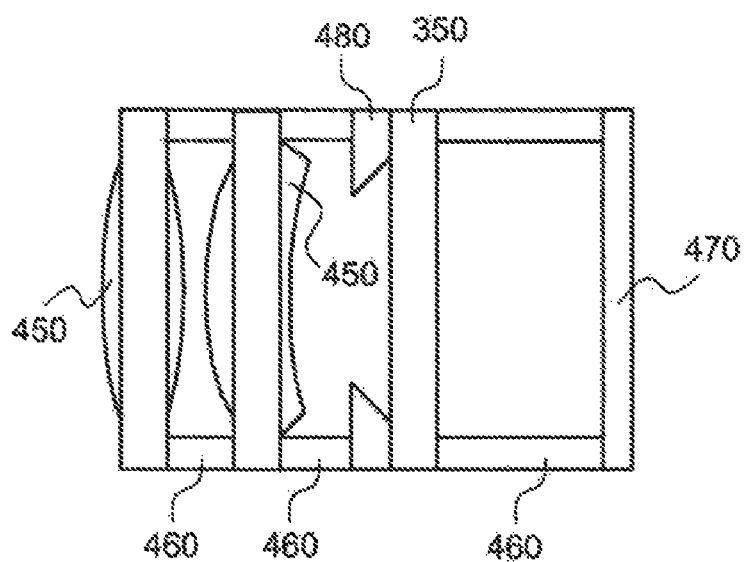
FIG. 4B is a schematic diagram of an image module with stackable components that can be made by wafer level manufacturing processes that includes the liquid crystal lens of the invention.

The dual range liquid crystal lens as shown in example embodiments as part of a lens assembly in a lens barrel in FIG. 4A and as part of a stacked lens assembly as would typically be made by wafer level manufacturing in FIG. 4B. In both examples, various positions along the optical axis are possible for the dual range liquid crystal lens to function effectively within the lens assembly for focusing e.g. the center location is shown but the lens could be located closer to either end or even to the left side of the of the other lenses in FIGS. 4A and 4B.

Figure 5:
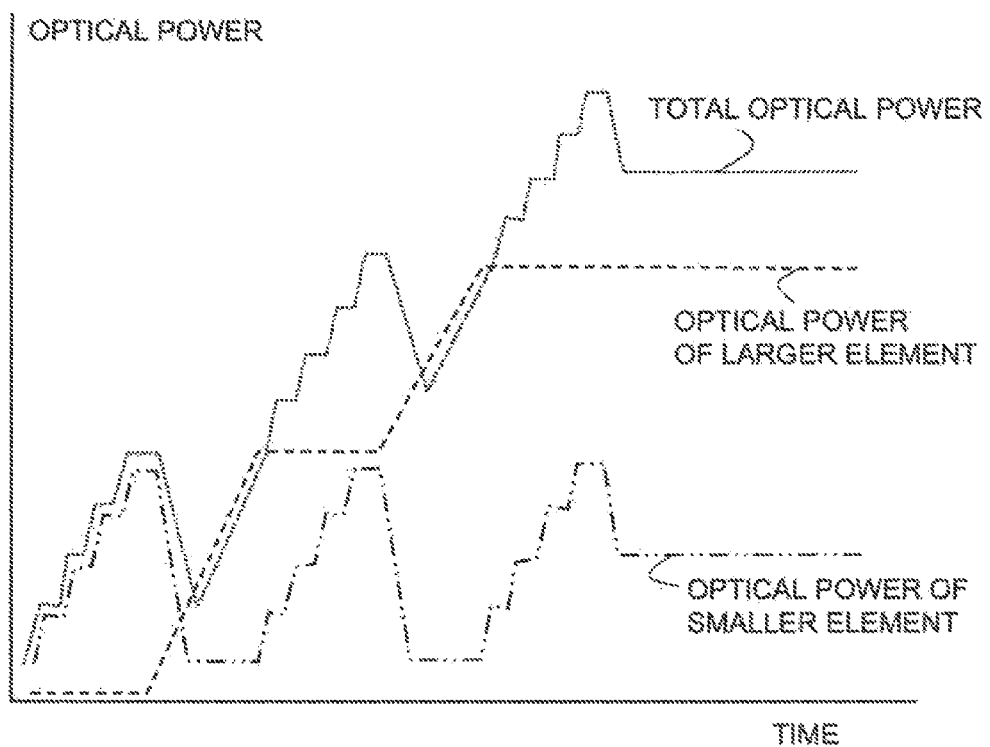
FIG. 5 is an illustration of a first hill climb routine that uses a dual range liquid crystal lens as provided by the invention wherein the thin liquid crystal lens is used in a cyclic manner over a small optical power range while the thick liquid crystal lens is used in large optical power steps as needed.

FIG. 5 shows an illustration of a method for using a dual range liquid crystal lens 350 as a focus lens in an autofocus system with a modified "hill climb" method. In this method, the 2 liquid crystal lenses 365 and 385 are operated independently to produce faster focusing. The thin liquid crystal lens 385 is operated to provide a series of small fast steps in optical power over a small range of optical power. The thick liquid crystal lens 365 of the dual range liquid crystal lens 350 is used to provide larger steps in optical power over a larger range of optical power as needed. The optical power produced by the dual range liquid crystal lens 350 is also shown in FIG. 5 as the combined effect of the thinner liquid crystal lens 385 and the thicker liquid crystal lens 365. For comparison, a continuous optical power ramp as would be produced by a PRIOR ART single liquid crystal lens is shown in FIG. 5 as well, in actual use, the optical power curve for the PRIOR ART single liquid crystal lens would be even slower due the steps that would be included for captures of autofocus images.

An autofocus process in accordance with an embodiment of the invention begins in Step 600 when the user pushes the capture button. In 610, the thin and thick liquid crystal lenses both start at the extreme end of optical power, either the low end of their respective optical power ranges or at the high end of their respective optical power ranges. In 620, an autofocus image is captured with the current settings of the thin 385 and thick 365 liquid crystal lenses of the dual range liquid crystal lens. The optical power of the thin liquid crystal lens 385 is then changed by one focus zone in 630. Where a focus zone is determined by the depth of field of the lens assembly. Another autofocus image is then captured in 640 with the new setting of the thin liquid crystal lens 385 and the previous setting of the thick liquid crystal lens 365. In 650, the direction of the process is determined based on whether the thin liquid crystal lens 385 is at the end of it's focus range. If the thin liquid crystal lens 385 is not at the end of it's focus range, the process loops back to 630 to complete the capture of the set of autofocus images within the focus range of the thin liquid crystal lens 385.

When the thin liquid crystal lens 385 reaches the end of it's focus range, and the set of autofocus images for the focus range of the thin liquid crystal lens 385 has been completed, the set of autofocus images is evaluated for focus values in 655. The focus values for the set of autofocus images are then compared to one another in 660 to determine if a peak focus value is present within the set of autofocus images. If a peak focus value is not detected in 660, the process proceeds to 670. In 670, if the thick liquid crystal lens 365 is not at the end of it's focus range, the process proceeds to 665 where the thin liquid crystal lens 385 is reset to the beginning extreme condition of optical power and the optical power of the thick liquid crystal lens 365 is changed by one large step which equates to the focus range of the thin liquid crystal lens 385. The process then continues back to 620 to capture and evaluate another set of autofocus images using the thin liquid crystal lens 385.

If at 660, a peak focus value is detected within the set of focus values for the autofocus images, further capture of autofocus images is stopped and the process proceeds to 690. In 690, the thin liquid crystal lens 385 and the thick liquid crystal lens 365 are set to the optical power settings that correspond to the conditions that the autofocus image was captured with which has the peak focus value. A final image is then captured in 695 and stored.

If at 670, the thick liquid crystal lens 365 is at the end of its focus range, the process continues on to 675 where the focus values of all the sets of autofocus images are evaluated together. If a peak focus value is detected within the combined set of autofocus images in 680, the process moves to 690. Where, in 690, the thin 385 and thick 365 liquid crystal lenses are set to the optical power settings that correspond to the peak focus value detected in the combined set of autofocus images. A final image is then captured in 695 using the optical power settings determined from the combined set of autofocus images.

If a peak focus value is not detected within the combined set of autofocus images in 680, the thin 385 and thick 365 liquid crystal lenses are set to the optical power settings that correspond to hyperfocal conditions for the lens assembly. Where the hyperfocal conditions focus the lens so that the largest portion of the image will be in focus from near to far objects in the scene. A final image is then captured in 695 using the optical power settings for hyperfocal conditions.

Figure 7:
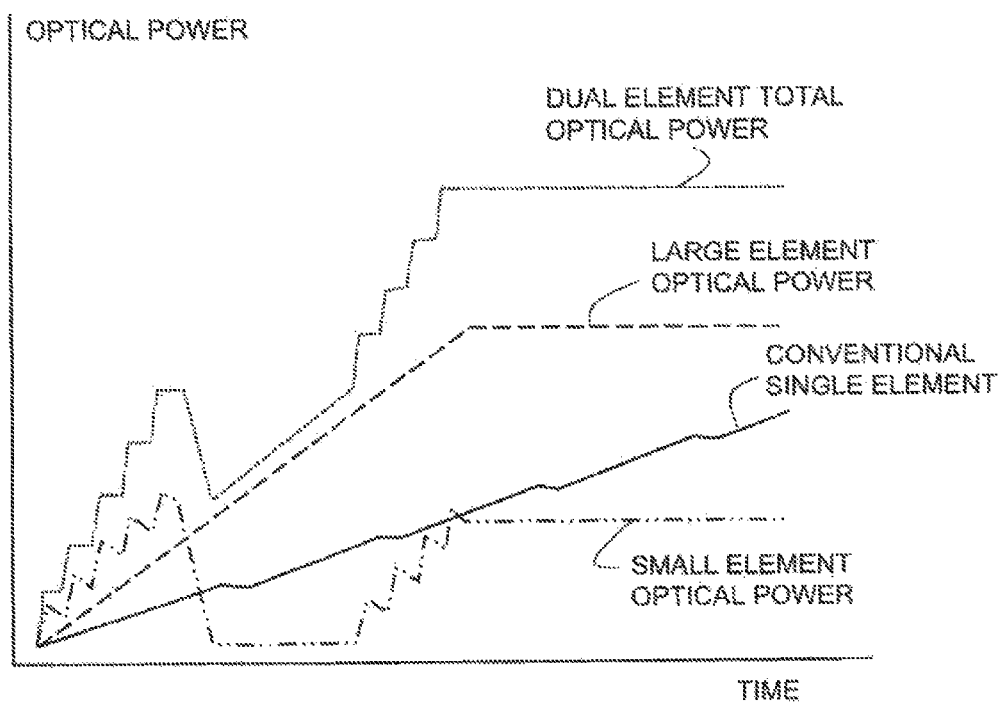
FIG. 7 is an illustration of an alternate hill climb routine that uses a dual range liquid crystal lens as provided by the invention wherein the thicker liquid crystal lens is run in a continuous optical power ramp while the thin liquid crystal lens is run in a cyclic manner.
Figure 8:
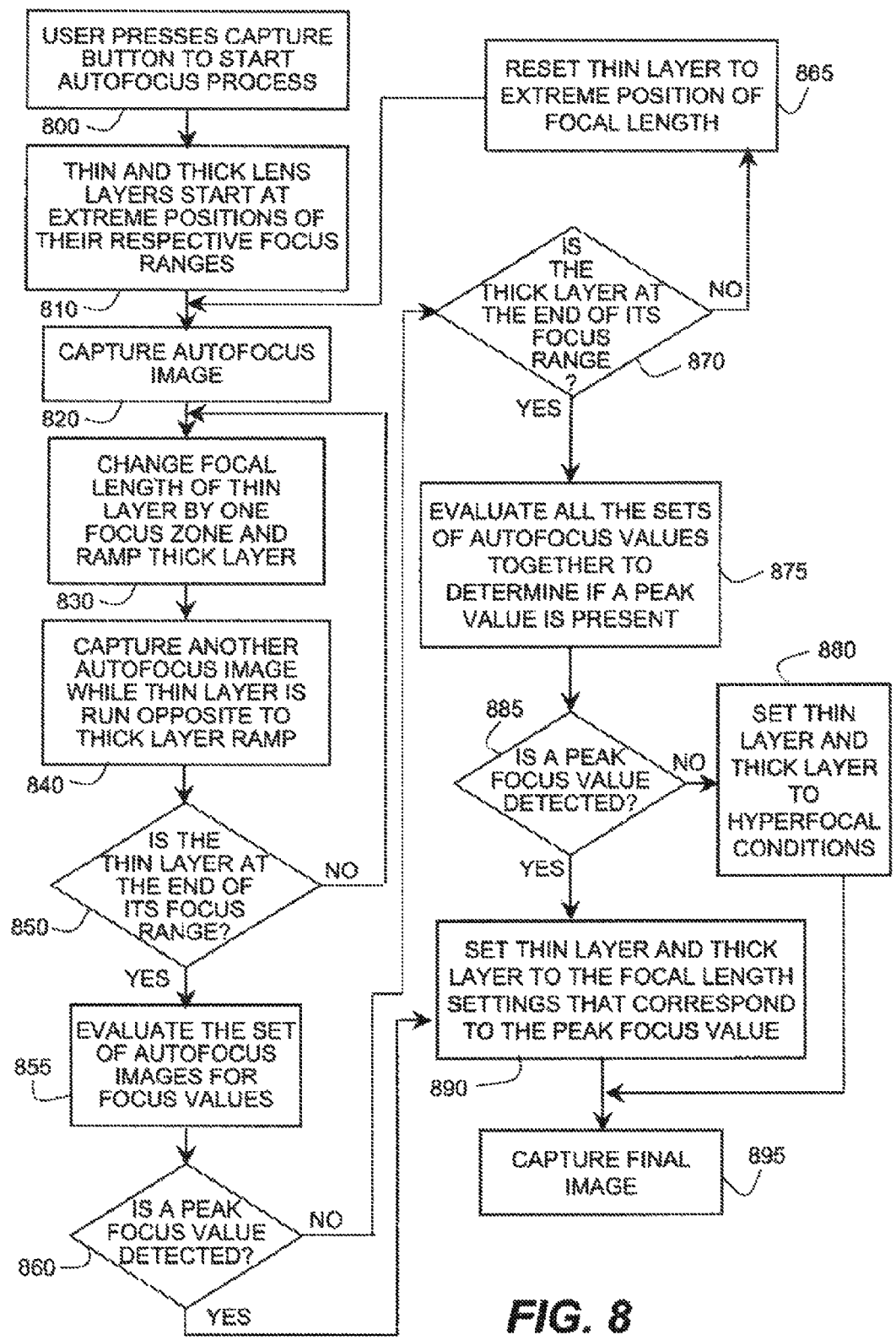
FIG. 8 is a flow chart that shows an example of the process steps for autofocus and capture of a final image when using the alternate hill climb routine from FIG. 7.

FIG. 7 shows an alternate illustration of a method for using a dual range liquid crystal lens as a focus lens in an autofocus system with a modified "hill climb" method in accordance with another embodiment of the invention. In this method, the 2 liquid crystal lenses 365 and 385 are operated simultaneously but in different manners. In this embodiment, the thick liquid crystal lens 365 is operated in a continuous ramp wherein the ramp is substantially as fast as the thick liquid crystal lens 365 can respond but is relatively slow compared to the response of the thin liquid crystal lens 385. At the same time, the thin liquid crystal lens 385 is operated in a series of small steps similar to the other embodiment described previously. When the thin liquid crystal lens 385 reaches the end of it's focus range, the thin liquid crystal lens 385 is reset to it's starting extreme position until the thick liquid crystal lens 365 reaches an optical power that corresponds to the end of the focus range of the thin liquid crystal lens 385. The thin liquid crystal lens 365 is then operated through another set of small steps. The process is repeated. In addition, in this embodiment, the thin liquid crystal lens 385 can be operated in a reverse manner to the change in optical power that occurs in the thick liquid crystal lens 365 during the time that the autofocus image is captured. In this way, the change in optical power of the thin liquid crystal lens 385 compensates for the change in optical power of the thick liquid crystal lens 365 during the time that the autofocus image is captured so that each autofocus image is captured with a constant optical power. The optical power produced by the dual range liquid crystal lens 350 is also shown in FIG. 7 as the combined effect of the thinner liquid crystal lens 385 and the thicker liquid crystal lens 365. For comparison, a continuous optical power ramp as would be produced by a PRIOR ART single liquid crystal lens is shown in FIG. 7 as well, although in actual use, the optical power curve for the PRIOR ART single liquid crystal lens would be even slower due the steps that would be included for captures of autofocus images. FIG. 8 shows a flow chart for the method illustrated in FIG. 7.

Figure 6:
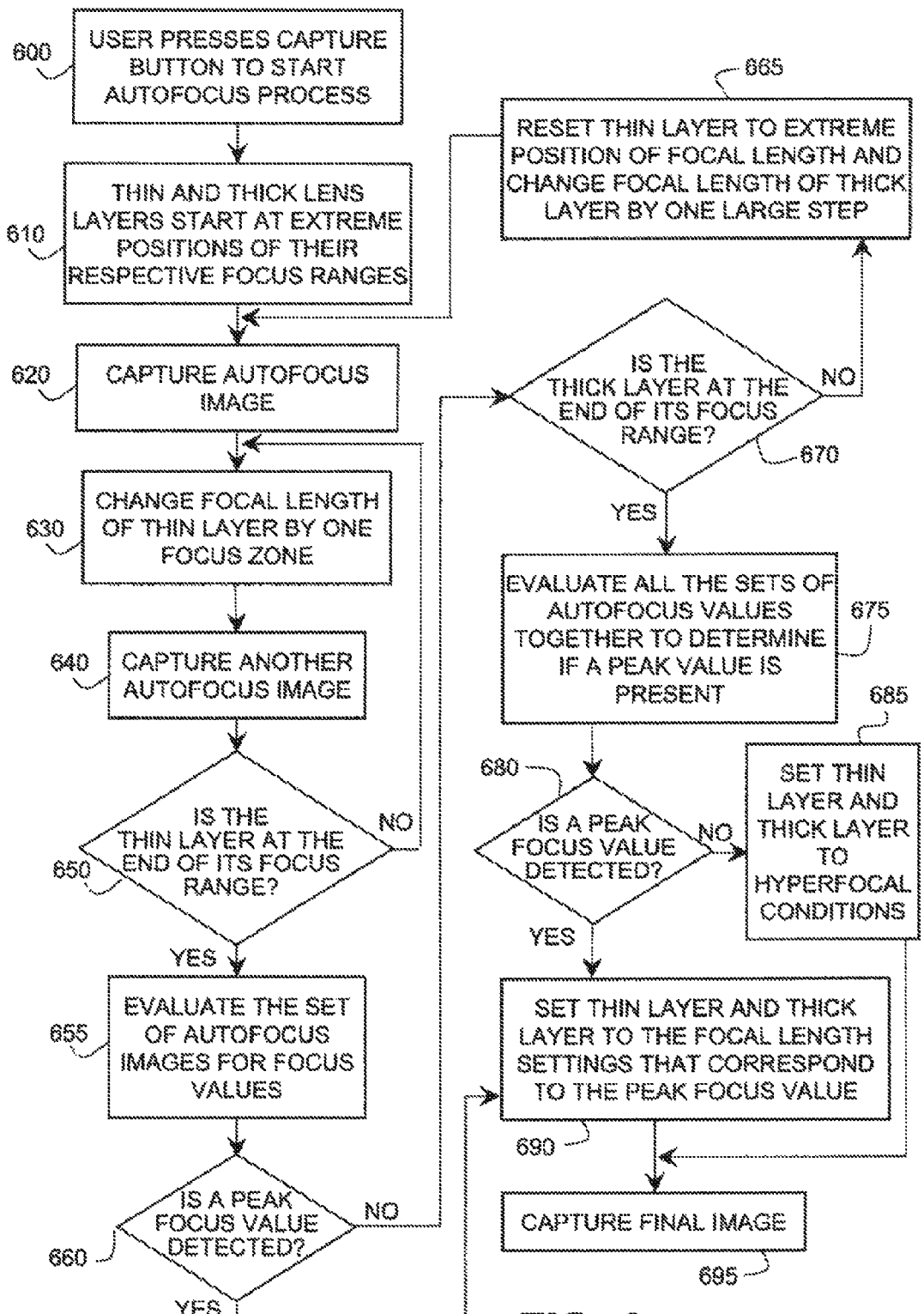
FIG. 6 is a flow chart that shows an example of the process steps for autofocus and capture of a final image when using the first hill climb routine from FIG. 5.

In FIG. 8, the autofocus process is similar to that shown in FIG. 6 with the following exceptions. After an autofocus image has been captured at 620, the process moves to 830 where the optical power of the thin liquid crystal lens 385 is changed by one focus zone and the thick liquid crystal lens 365 is ramped continuously. In 840, another autofocus image is captured while the thin liquid crystal lens 385 is run opposite to the ramp of the thick liquid crystal lens 365 so that the changes in optical power that occur during the capture of the autofocus image compensate for each other. The process then continues as previously described to capture and evaluate a set of autofocus images captured within the focus range of the thin liquid crystal lens. If a peak focus value is not detected in 660, and the thick liquid crystal lens 365 is not at the end of it's focus range as determined in Step 670, the processes continues on to 865. In 865, the thin liquid crystal lens 385 is reset to it's previous extreme position of optical power and the process returns to 620. The remainder of the process is as described previously for FIG. 6.

It should be noted that the fastest focus time is achieved when a peak focus value can be found within the first set of autofocus images which are produced with the first set of optical power steps from the thin liquid crystal lens. Therefore, in a further embodiment of the invention, the first setting of the thick liquid crystal lens is chosen to be near the most likely focus setting for the final image. This first setting can be chosen as the hyperfocal length setting for the lens assembly or alternately the first setting can be chosen to be the focus setting for the last image captured. Wherein the hyperfocal length setting is chosen if it has been a substantial period of time since the last image capture, e.g. more than 1 hour ago and the last image capture setting is chosen if the last image captured was under 1 hour ago. Other timings can be chosen for the change between the different first settings. As a further embodiment of the invention, the first focus setting is chosen based on the recurring usage patterns of the operator.

As an example embodiment of a fast autofocus system, a dual range liquid crystal lens is combined with an image sensor that has some pixels which are more sensitive to light such as panchromatic pixels which absorb a wider portion of the visible spectrum. In addition, the image sensor can be operated in a binned manner to increase the effective size and sensitivity of the pixels to light. Sets of autofocus images are captured using the process shown in FIG. 6 or FIG. 8 wherein the autofocus images are captured using only the central ¼ of the image sensor to reduce the number of pixels being readout and analyzed for focus values. In an additional embodiment of the invention, a dual range liquid crystal lens can be combined with a fast image sensor to provide a fast autofocus system.

Figure 9:
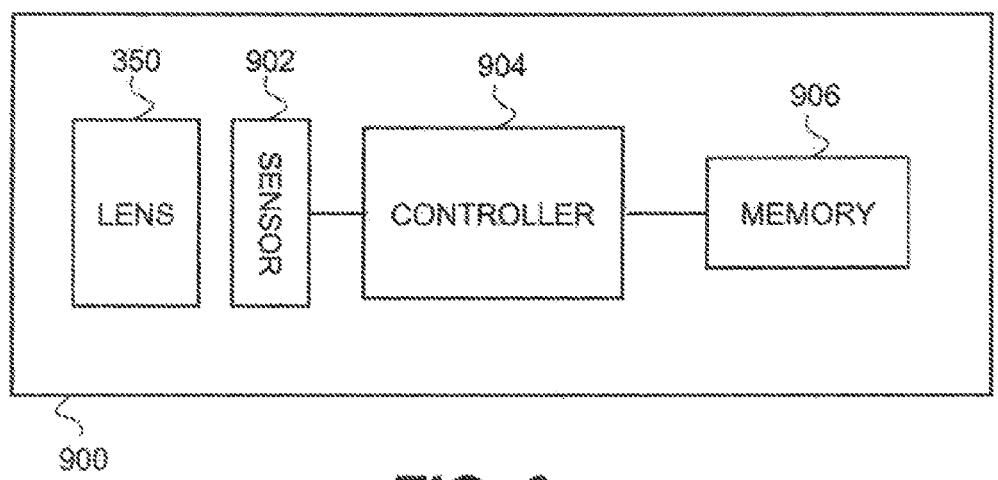
FIG. 9 is a simplified block diagram of an image capture device in accordance with an embodiment of the invention.

In FIG. 9 there is shown a simplified block diagram of an image capture device 900, such as a digital camera or video camcorder, etc. in accordance with an embodiment of the invention. The image capture device includes lens assembly 350 and sensor 902 and a controller 904 coupled to the sensor 902. The controller can comprise one of a number of microprocessors, microcontrollers, etc. known in the art. A memory section block 906 can include both volatile and nonvolatile memory for storing the software that will execute the methods previously described above.

The invention has been described in detail with particular reference to certain preferred embodiments thereof, but it will be understood that variations and modifications are effected within the spirit and scope of the invention.

| | PARTS LIST |
|---|---|
| 100 | Process block |
| 110 | Process block |
| 120 | Process block |
| 130 | Process block |
| 140 | Process block |
| 150 | Process block |
| 160 | Process block |
| 170 | Process block |
| 180 | Process block |
| 300 | PRIOR ART single liquid crystal lens assembly |
| 310 | Electrode |
| 320 | Electrode |
| 330 | Liquid crystal lens |
| 350 | Dual range liquid crystal lens assembly |
| 360 | Electrode |
| 365 | Thicker liquid crystal lens |
| 370 | Electrode |
| 380 | Electrode |
| 385 | Thinner liquid crystal lens |
| 400 | Fixed optical power lens elements |
| 410 | Lens barrel |
| 420 | Aperture stop |
| 430 | Image sensor |
| 450 | Fixed optical power lens elements |
| 460 | Spacers |
| 470 | Image sensor |
| 480 | Aperture stop |
| 600 | Process block |
| 610 | Process block |
| 620 | Process block |
| 630 | Process block |
| 640 | Process block |
| 650 | Process block |
| 655 | Process block |
| 660 | Process block |
| 665 | Process block |
| 670 | Process block |
| 675 | Process block |
| 680 | Process block |
| 685 | Process block |
| 690 | Process block |
| 695 | Process block |
| 830 | Process block |
| 840 | Process block |
| 865 | Process block |

The invention claimed is:

1. A dual range focus element, comprising:
   a first liquid crystal lens comprised of two layers of liquid crystal materials with orthogonal molecular orientations;
   a second liquid crystal lens comprised of two layers of liquid crystal materials with orthogonal molecular orientations having a common optical axis with the first liquid crystal lens;
   the first liquid crystal lens having a greater thickness than the second liquid crystal lens; and
   the first and second liquid crystal lens each use different focusing techniques and together form a focusing system with an optical power that is the combined optical powers of the first and second liquid crystal lenses.

2. A dual range focus element as defined in claim 1, wherein the second liquid crystal lens uses a focusing technique that uses smaller optical power increments as compared to the first liquid crystal lens.

3. A dual range focus element as defined in claim 1, wherein the first and second liquid crystal lenses uses a common electrode located between them.

4. A dual range focus element as defined in claim 1, wherein the thickness ratio of the first liquid crystal lens to the second liquid crystal lens can vary in the range from 60:40 to 95:5.

5. A dual range focus element as defined in claim 1, wherein the second liquid crystal lens uses a hill climb focusing technique that uses smaller steps than the first liquid crystal lens.

6. A dual range focus element as defined in claim 1, wherein the first liquid crystal lens is only used as needed during focusing of the dual range focus element.

7. A method for focusing an image capture device including first and second liquid crystal lenses, each comprised of two layers of liquid crystal materials with orthogonal molecular orientations, having a combined optical power and a common optical axis and the first liquid crystal lens having a greater thickness than the second liquid crystal lens, comprising:
   focusing the first and second liquid crystal lenses differently from each other in order to decrease the time it takes to focus the image being captured.

8. A method as defined in claim 7, wherein the second liquid crystal lens uses a focusing technique that uses smaller optical power increments as compared to the first liquid crystal lens.

9. A method as defined in claim 7, wherein the second liquid crystal lens uses a hill climb focusing technique that uses smaller steps than the first liquid crystal lens.

10. A method as defined in claim 7, further comprising:
    operating the second liquid crystal lens in a cyclic set of incremental power changes.

11. A method as defined in claim 10, further comprising: periodically adjusting the optical power to the first liquid crystal lens after the completion a set of incremental power changes to the second liquid crystal lens.

12. A method as defined in claim 10, further comprising:
    capturing focus images after each incremental power change; and
    evaluating the quality of focus after a set of the incremental power changes have been performed.

13. A method as defined in claim 7, further comprising:
    operating the second liquid crystal lens in a cyclic set of incremental power changes in combination with continuous optical power adjustments to the first liquid crystal lens.

14. An image capture device, comprising:
    an image sensor;
    a first liquid crystal lens comprised of two layers of liquid crystal materials with orthogonal molecular orientations;
    a second liquid crystal lens comprised of two layers of liquid crystal materials with orthogonal molecular orientations and having a common optical axis with the first liquid crystal lens and the image sensor;
    the first liquid crystal lens having a greater thickness than the second liquid crystal lens; and
    the first and second liquid crystal lens each use different focusing techniques and together form a focusing system with an optical power that is the combined optical powers of the first and second liquid crystal lenses.

15. An image capture device, as defined in claim 14, further comprising:
    a common electrode located between the first and second liquid crystal lenses.

16. An image capture device as defined in claim 14, wherein the image sensor includes panchromatic pixels.

17. An image capture device as defined in claim 14, wherein the thickness ratio of the first liquid crystal lens to the second liquid crystal lens can vary in the range from 60:40 to 95:5.

18. An image capture device as defined in claim 14, wherein the second liquid crystal lens uses a focusing technique that uses smaller optical power increments as compared to the first liquid crystal lens.

19. An image capture device as defined in claim 18, wherein the second liquid crystal lens uses a hill climb focusing technique that uses smaller steps than the first liquid crystal lens.

20. An image capture device as defined in claim 19, wherein the first liquid crystal lens is only used as needed during focusing of the dual range focus element.

* * * * *